O. NELSSON.
COW TAIL HOLDER.
APPLICATION FILED SEPT. 11, 1911.
1,023,588.
Patented Apr. 16, 1912.
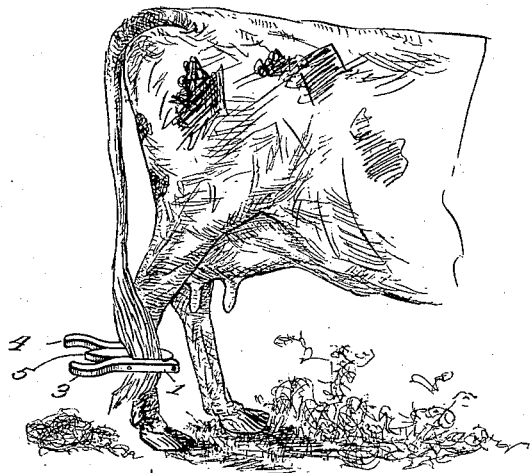
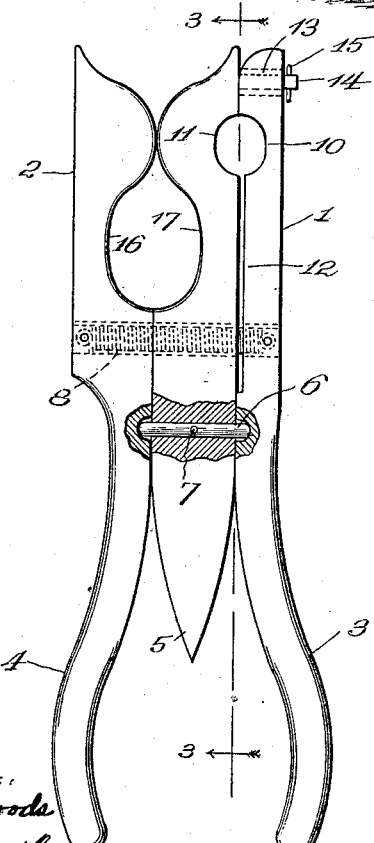
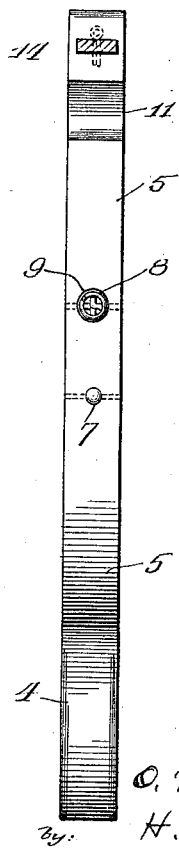
Witnesses:
Inventor:
O. Nelsson
by H. Sanders
Atty

UNITED STATES PATENT OFFICE.

OSKAR NELSSON, OF HAMPSHIRE, ILLINOIS.

COW-TAIL HOLDER.

1,023,588.   Specification of Letters Patent.   Patented Apr. 16, 1912.

Application filed September 11, 1911. Serial No. 648,594.

*To all whom it may concern:*

Be it known that I, OSKAR NELSSON, a citizen of Sweden, residing at Hampshire, in the county of Kane and State of Illinois, have invented certain new and useful Improvements in Cow-Tail Holders, of which the following is a specification.

This invention relates to devices for holding cows' tails during the milking operation or at other desired times.

The object of the invention is to provide an improved device of the class that is simple in construction and operation and positive in action.

A further object is to provide a device of the kind that is humane and not painful to the animal when in operation.

A further object is to provide a device of the class having separate jaws for engagement with the leg and tail of the cow so that the instrument may be permitted to remain upon the leg when not in use to hold the tail thus obviating possible loss of or misplacement of the device.

Another object is the provision of a positive lock rendering withdrawal of the tail by the animal an impossibility.

With the foregoing and other objects in view the invention consists in the combination and arrangement of parts to be hereinafter fully described in the following specification, pointed out in the claim and illustrated in the accompanying drawing which forms a part of the specification and in which—

Figure 1 is a fragmentary side elevation showing my device in use. Fig. 2 is a plan of the device partly in section. Fig. 3 is a vertical section taken on line 3—3 of Fig. 2.

Like reference characters indicate corresponding parts throughout the several views.

The device comprises a pair of jaws 1 and 2 terminating in handles 3 and 4 respectively. Between the said jaws a tongue 5, converging to a point at its lower end, is supported upon a pin 6, the ends of the said pin being embedded in the aforesaid jaws and the body of the pin being pierced by a tiny transverse pin 7 the ends of which are embedded in the tongue 5; the purpose of this arrangement being to avoid movement of the tongue in a plane parallel to the vertical planes of the jaws.

8 is a spring having either end fastened in a transverse recess in either jaw and extending through a transverse aperture 9 in the tongue 5, the purpose of the spring being to draw either jaw firmly against the said tongue.

Near the forward end of the jaw 1 the same is provided with a semi-circular recess 10 which is disposed directly opposite a similar recess 11 in the tongue 5 and the jaw 1 is partly cut away as at 12 upon its surface adjacent the tongue from the circumference of the recess 10 to a point below the spring 8 so that the ends of the said jaw and the tongue 5 may be held firmly against each other. A transverse aperture 13 is provided in the jaw 1 between the recess 10 and the forward end and through this aperture a bolt 14, secured to the tongue 5, extends and the free end thereof projecting beyond the said jaw is secured against withdrawal by a transversely extending pin 15.

Referring now to the jaw 2 the same is provided upon its inner side near the forward end with an enlarged somewhat semi-circular recess 16 and a similar recess 17 located directly opposite is formed in the adjacent face of the tongue 5.

Operation: The purpose of the opening formed by the adjacent recesses 16 and 17 is to enable the device to be fastened upon the leg of the animal, this is accomplished by pressing the handles 3 and 4 together, they obtain a bearing upon the tongue 5, which draws apart the abutting end of the jaw 2 and tongue 5 above their recesses and admits the leg of the animal; this movement of the said handles, after the pin 15 has been withdrawn from the bolt, also disengages the meeting ends of the tongue 5 and jaw 1 for insertion in their recessed portions 11 and 10, respectively, of the tail of the animal. When pressure is removed from the handles the forward ends of the device will be brought together again by the spring 8 when the pin 15 may again be inserted in the bolt and the device will occupy the position illustrated in Fig. 1. It is readily seen that the tail may be withdrawn without withdrawing the leg of the animal if desired.

What is claimed is:—

In a device of the class described, a pair of jaws each provided with a recess near its forward extremity and terminating in handles, a pin having its extremities embedded in the said jaws, an apertured tongue mounted on the said pin between the jaws provided with recesses in alinement with the recesses of the jaws and terminating at one extremity in a point, a spring passing through the aperture in the said tongue and having its extremities embedded in the jaws and means carried at the forward extremity of the said tongue for locking it in engagement with one of the aforesaid jaws.

In testimony that I claim the foregoing as my own I have hereto affixed my signature in the presence of two subscribing witnesses.

OSKAR NELSSON.

Witnesses:
C. L. ANDERSON,
ANDREW NELSON.

Copies of this patent may be obtained for five cents each, by addressing the "Commissioner of Patents, Washington, D. C."